United States Patent [19]

Golden

[11] Patent Number: 5,678,639

[45] Date of Patent: Oct. 21, 1997

[54] SELF-CONTAINED BIOREMEDIATION UNIT WITH DUAL AUGER HEAD ASSEMBLY

[76] Inventor: Randy Golden, 15 S. 14th St., Council Bluffs, Iowa 51501

[21] Appl. No.: 609,535

[22] Filed: Mar. 1, 1996

[51] Int. Cl.$^6$ ................................................. A01B 33/00
[52] U.S. Cl. ................ 172/52; 172/112; 172/532; 172/119; 405/128; 37/464
[58] Field of Search ................ 172/48, 49–52, 172/22, 532, 111, 112, 119; 37/403, 350, 351, 352, 242, 464; 405/128; 299/39

[56] References Cited

U.S. PATENT DOCUMENTS

| | | | |
|---|---|---|---|
| 3,039,208 | 6/1962 | Oglesby et al. | 37/81 |
| 3,209,473 | 10/1965 | Davis | 37/86 |
| 3,404,470 | 10/1968 | Raiti | 37/242 X |
| 4,043,135 | 8/1977 | Hoes et al. | 37/352 X |
| 4,113,023 | 9/1978 | Baskett | 37/403 X |
| 4,364,434 | 12/1982 | Erholm | 37/403 X |
| 4,714,294 | 12/1987 | Swan | 299/39 |
| 4,819,348 | 4/1989 | DeBolt | 37/350 |
| 4,998,775 | 3/1991 | Hollifield | 299/39 |
| 5,060,732 | 10/1991 | Baskett | 171/63 |
| 5,092,658 | 3/1992 | Smith | 299/39 |
| 5,199,195 | 4/1993 | Scordilis et al. | 37/350 |
| 5,199,196 | 4/1993 | Straley | 37/403 X |
| 5,242,246 | 9/1993 | Manchak, III et al. | 405/128 |
| 5,244,306 | 9/1993 | Artzberger | 404/128 |
| 5,259,327 | 11/1993 | Thompson, Jr. et al. | 111/118 |
| 5,271,694 | 12/1993 | Cooper | 405/128 |
| 5,382,084 | 1/1995 | Diver et al. | 299/39 |
| 5,404,660 | 4/1995 | Webster | 37/403 X |
| 5,540,003 | 7/1996 | Osadchuk | 37/403 X |
| 5,545,801 | 8/1996 | Fulton | 405/128 |
| 5,560,737 | 10/1996 | Schuring et al. | 405/128 |
| 5,562,588 | 10/1996 | Higgins | 405/128 X |
| 5,563,066 | 10/1996 | Buckanan | 405/128 X |

FOREIGN PATENT DOCUMENTS 7804-152  10/1979  Netherlands ................ 172/48

Primary Examiner—Terry Lee Melius
Assistant Examiner—Victor Batson
Attorney, Agent, or Firm—Zarley, McKee, Thomte, Voorhees & Sease; John A. Beehner

[57] ABSTRACT

A self-contained bioremediation unit is adapted for quick coupling to a front-end loader, bulldozer or the like with no power connections between them. It carries its own engine and fuel tank for hydraulic driving of a dual horizontal auger head assembly for pulverizing, homogenizing and windrowing soil as the unit is advanced across a site. An upper auger is positioned above and forwardly of a lower auger for further pulverizing a soil first broken up by the lower auger. The unit includes its own water tank for carrying water and bacteria and a spray system for spraying the water and bacteria onto soil pulverized by the auger assembly. A hopper may be provided on the unit for dispensing fertilizer into the soil being pulverized by the auger assembly.

14 Claims, 8 Drawing Sheets

SELF-CONTAINED BIOREMEDIATION UNIT WITH DUAL AUGER HEAD ASSEMBLY

BACKGROUND OF THE INVENTION

Technical Field

The present invention is directed generally to bioremediation equipment and more particularly to a self-contained bioremediation unit adapted to be readily connected to a front end loader, crawler loader, bull dozer or the like and which includes its own power source, fuel supply, hydraulic system and dual horizontal auger head assembly for pulverizing and homogenizing soil to be treated.

A new industry is developing for cleaning up plots of land where oil tanks and the like have leaked oil or other organic contaminants into the soil, sometimes over a long period of years. An early solution was to dig up the dirt approximately 6 feet deep from the entire plot and truck it off for disposal or to a treatment center and truck the dirt back. Disposal in land fills has become disadvantageous because of the unavailability of land fill sites and the risk of ground water contamination. Disposal by incineration is generally cost prohibitive. Likewise, the transportation of removed soil to and from treatment centers is generally cost prohibitive regardless of the distance between the site and the treatment facility.

Accordingly, bioremediation was developed to treat soil without removal from the site.

Typically, specialized machinery having a large single front auger would be driven across the ground to pulverize a certain depth of soil as the auger rotates and to move the soil off to one side of the unit to form a windrow. The large single auger typically either had teeth or auger flighting which tended to wear out very quickly especially in rocky soil, requiring frequent and expensive changes of the auger teeth. Likewise, the chain drive for the augers of such units presented numerous wear points requiring frequent maintenance and occasional repairs.

Another disadvantage of such specialized machinery is that it is very expensive and usable solely for soil remediation. Some such dedicated remediation equipment are so wide that they render the transport truck over size or over weight so that they cannot be transported at night. This is a significant disadvantage for emergency jobs by environmental spill response contractors.

Even auger units that were adapted to be detachably connected to front end loaders, bulldozers and the like required a separate pass across the field by separate spray equipment for spraying the oil eating bacteria onto the soil worked by the auger equipment. A substantial disadvantage of the two pass system, besides expense, was that the bacteria spray would only treat the upper crust of the windrowed soil. Mixing of the sprayed bacteria was not accomplished without another pass across the entire field by the auger unit. Even multiple passes across a site by known single auger equipment may not sufficiently break up the soil for full exposure of the hydrocarbons to the bacteria.

Accordingly, a primary object of the invention is to provide a self-contained bioremediation unit which is quickly and easily attachable to conventional motorized vehicles such as front end loaders, bulldozers and the like.

Another object is to provide such a self-contained bioremediation unit having a stacked dual auger head assembly for efficient pulverizing and homogenizing of the soil in a single pass.

Another object is to provide such a self-contained bioremediation unit which includes a complete spray system for spraying water and bacteria onto the soil, thereby eliminating the need for separate spray equipment.

A related object is to provide such a self-contained bioremediation unit which enables water and bacteria to be sprayed onto and throughout the soil being pulverized by the unit.

Another object of the invention is to provide such a self-contained bioremediation unit designed to minimize wear of the drive components and auger teeth. A related object is to provide such a self-contained bioremediation unit wherein worn teeth on the stacked dual auger head assembly can be readily and inexpensively replaced.

Another object is to provide such a self-contained bioremediation unit which can be easily transported without exceeding highway width and weight limits.

Another object is to provide such a self-contained bioremediation unit which is rugged in construction and efficient and economical in operation.

SUMMARY OF THE INVENTION

The self-contained bioremediation unit of the invention is adapted to be detachably connected to a front-end loader, crawler loader, bulldozer or the like. The unit is preferably connectable by a quick coupler to such a vehicle with no need for power connections between the unit and vehicle. The unit includes a dual horizontal auger head assembly including stacked upper and lower augers with the upper auger positioned forwardly of the lower auger. The chassis of the unit has an engine and fuel tank mounted thereon, at least one hydraulic pump driven by the engine, upper and lower hydraulic motors connected to the upper and lower augers and a hydraulic fluid reservoir connected to the hydraulic pump and motors. The chassis also carries a water tank for carrying the water and active ingredient for soil bioremediation. That active ingredient may include bacteria, surfactants and nutrients, among others. A spray means on the chassis is operative to spray water and bacteria onto soil traversed by the unit. A water pump directs water from the water tank to the spray means which is preferably positioned for spraying water and bacteria forwardly of the dual horizontal auger head assembly and onto soil as it is pulverized by the augers.

An auger guard plate may be positioned rearwardly and above the upper and lower augers so that soil pulverized by the lower auger is carried upwardly between the lower auger and auger guard plate for engagement by the upper auger. The upper auger is positioned sufficiently close the lower auger for receiving and breaking up soil carried upwardly by the lower auger.

The lower auger is designed to break up and pulverize hard soil, rocks and the like. It is preferably equipped with a plurality of sockets for drive-in knock-out fast replacement of ground breaking bits which may be round carbide tipped bits. The upper auger may be provided as an auger shaft having a plurality of paddles protruding radially therefrom and with a plurality of teeth modules replaceably connected to respective paddles for breaking down the particle size of soil engaged by the upper auger.

The chassis preferably includes a housing sealed on the bottom and sides to substantially block fluid entry into the housing upon immersion of the bioremediation unit to a depth less than the height of the housing. Other preferred features include a pressurized air source and air sparging means within the water tank and operative to discharge air into the water tank for increasing the life of bacteria. Headlights may be provided on the unit for night operation and side warning lights may be provided for signaling activation of the augers.

DESCRIPTION OF THE PREFERRED EMBODIMENT

Figure 1:
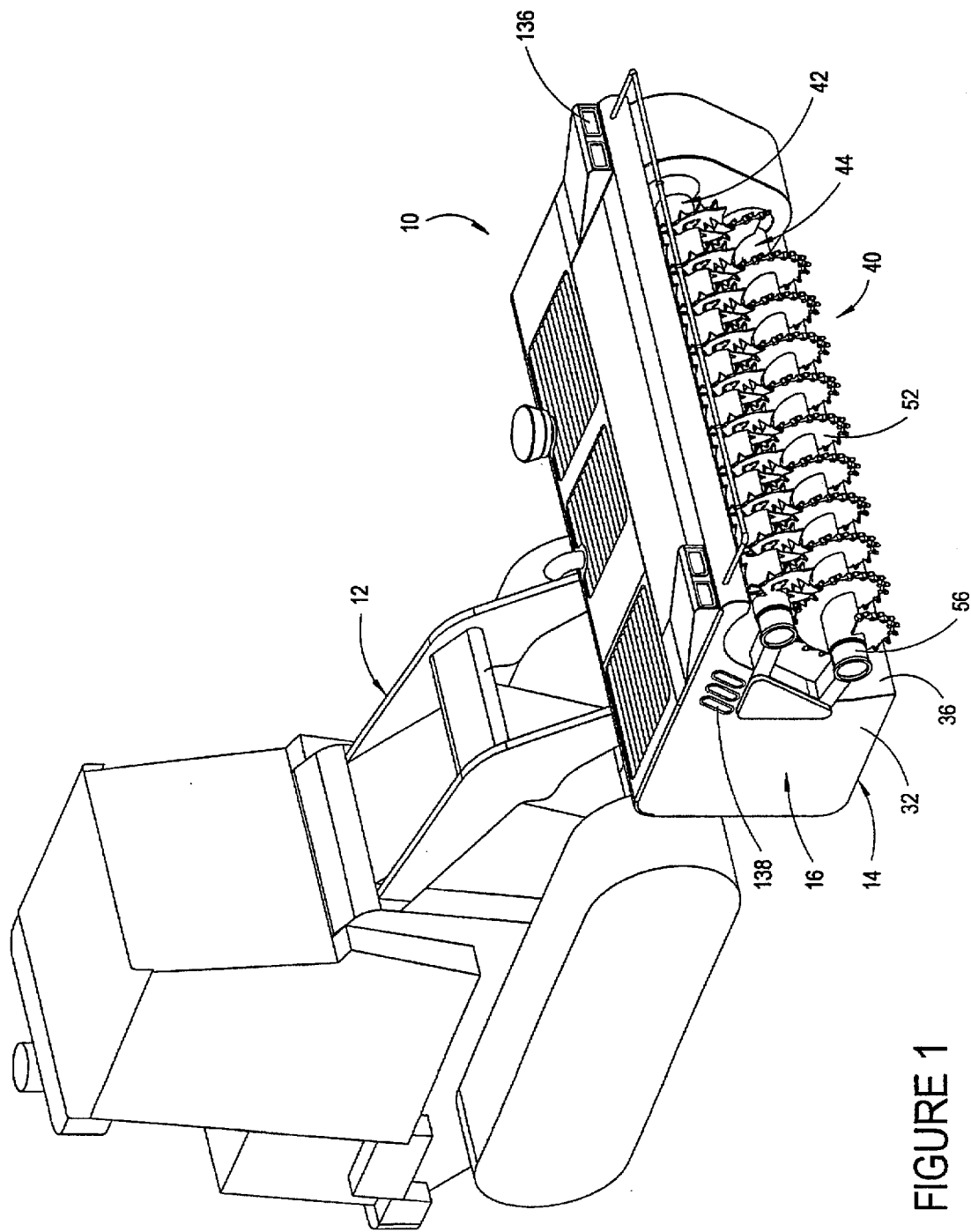
FIG. 1 is a perspective view of the self-contained bioremediation unit of the invention carried on a crawler tractor.

The self-contained bioremediation unit 10 of the invention is shown in FIG. 1 as mounted by a quick coupler 144 to a crawler loader 12. Other motorized vehicles such as wheeled front-end loaders or bulldozers could likewise carry the bioremediation unit 10 of the invention.

Bioremediation unit 10 includes a chassis 14 which includes a housing 16 sealed on the bottom and sides to substantially block fluid entry into the housing 16 upon immersion of the bioremediation unit to a depth less than the height of the housing. Structural support for the chassis is provided by a frame work including front, central and rear upper transverse frame members 18, 19 and 20 (FIGS. 3 and 6), lower transversely extended frame members 22, 23 and 24, upper and lower side bars 26 and 28 on each side of the chassis in and outer skin including rear backing plate 30, opposite side walls 32 and 34, a front auger guard plate 36 and a bottom wall 38 interconnecting all of the above to effect the sealed housing 16.

A preferred mounting of the bioremediation unit onto a front end loader or the like is preferably accomplished by any conventional quick coupler. One example is the Balderson Model Hydraulic Quick Coupler BQ 953H. A hydraulic spreader may be provided to move pins into place for locking the unit onto the front end loader 12 or the like. The chassis in the illustrated embodiment is sealed to the top of the housing, approximately 42" off the ground for operation in submerged or very wet soil to a depth of approximately 42".

Pulverizing of the soil is accomplished by a dual horizontal auger head assembly 40 which includes upper auger 42 and lower auger 44. Upper auger 42 includes an upper auger shaft 46 having flighting or paddles 48 mounted on shaft 46 and protruding radially outwardly therefrom. Lower auger 44 likewise includes a lower auger shaft 50 and paddles or flighting 52 secured thereon and protruding outwardly therefrom. Free-ends of the upper and lower auger shafts 46 and 50 are carried within upper and lower bearing collars 54 and 56 carried on the ends of forwardly protruding legs 58 and 60 of a somewhat C-shape auger support frame 62 mountable by a plurality of bolts 64 into a fitted recess 66 in one side of housing 16. The opposite ends of the upper and lower auger shafts 46 and 50 are connected and driven to upper and lower hydraulic motors 68 and 70 which are supported and sealed within a hydraulic motor casing 72 and the forward end of the opposite side of housing 16.

Figure 2:
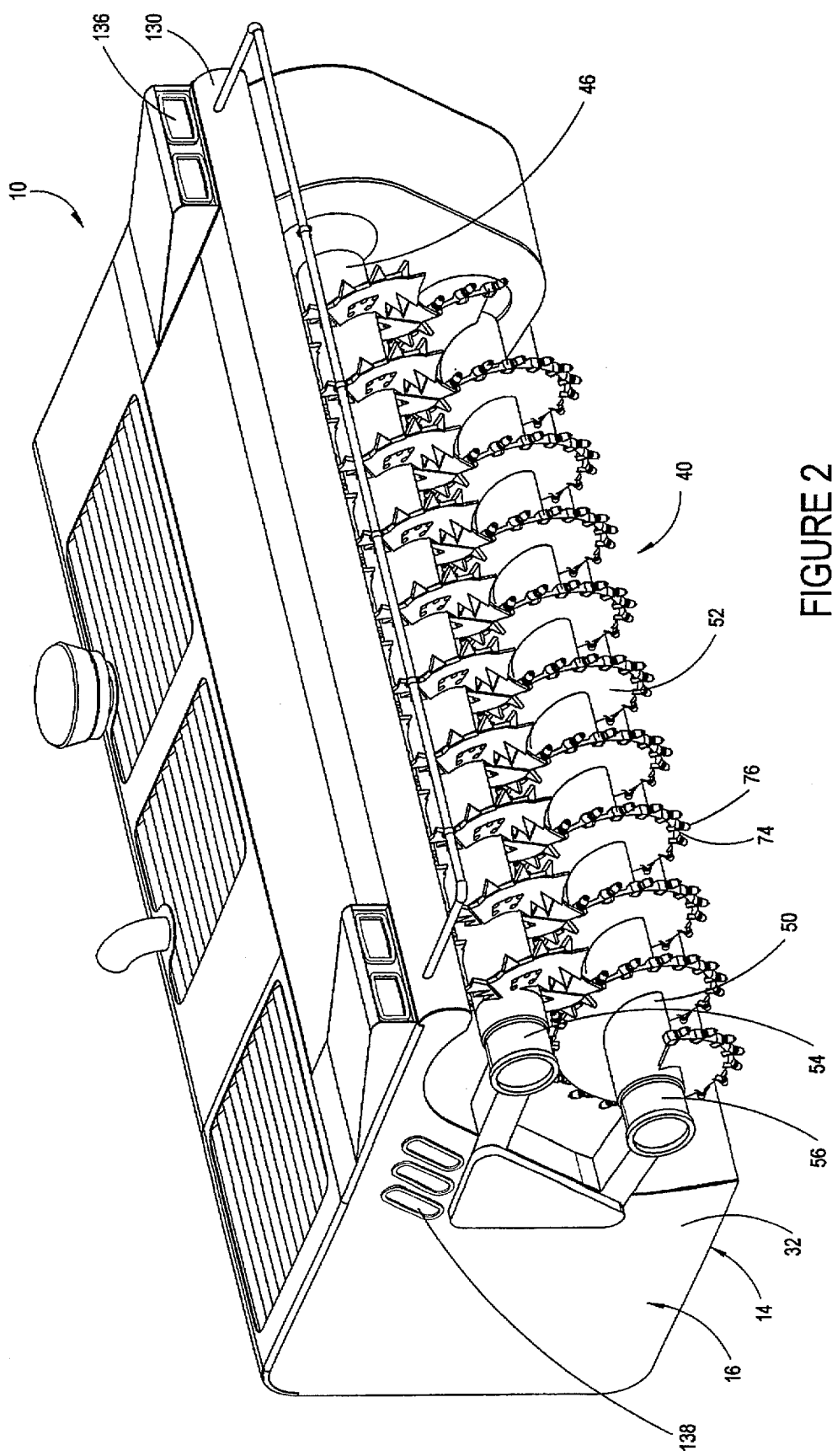
FIG. 2 is an enlarged perspective view of the self-contained bioremediation unit of the invention.

Lower auger 42 is designed to breakup and pulverize even hard soil and rock. In a preferred embodiment, flighting 52 is 23½" in diameter and has a one-half pitch for holding the material longer to break it up better, as compared to the ⅔ pitch on single auger units of others. Each flight moves the soil to the side by a dimension of 12". Other sizes and pitches may be incorporated for larger and smaller units or to accommodate particular ground conditions. Both the upper and lower augers 42 and 44 have right hand flighting for clockwise rotation when viewed from the pre-ends as in FIGS. 2 and 3 so as to move soil in a direction from the driven end of the augers to the free ends where the soil is deposited in a windrow as the bioremediation unit 10 advances across the site.

Figure 4:
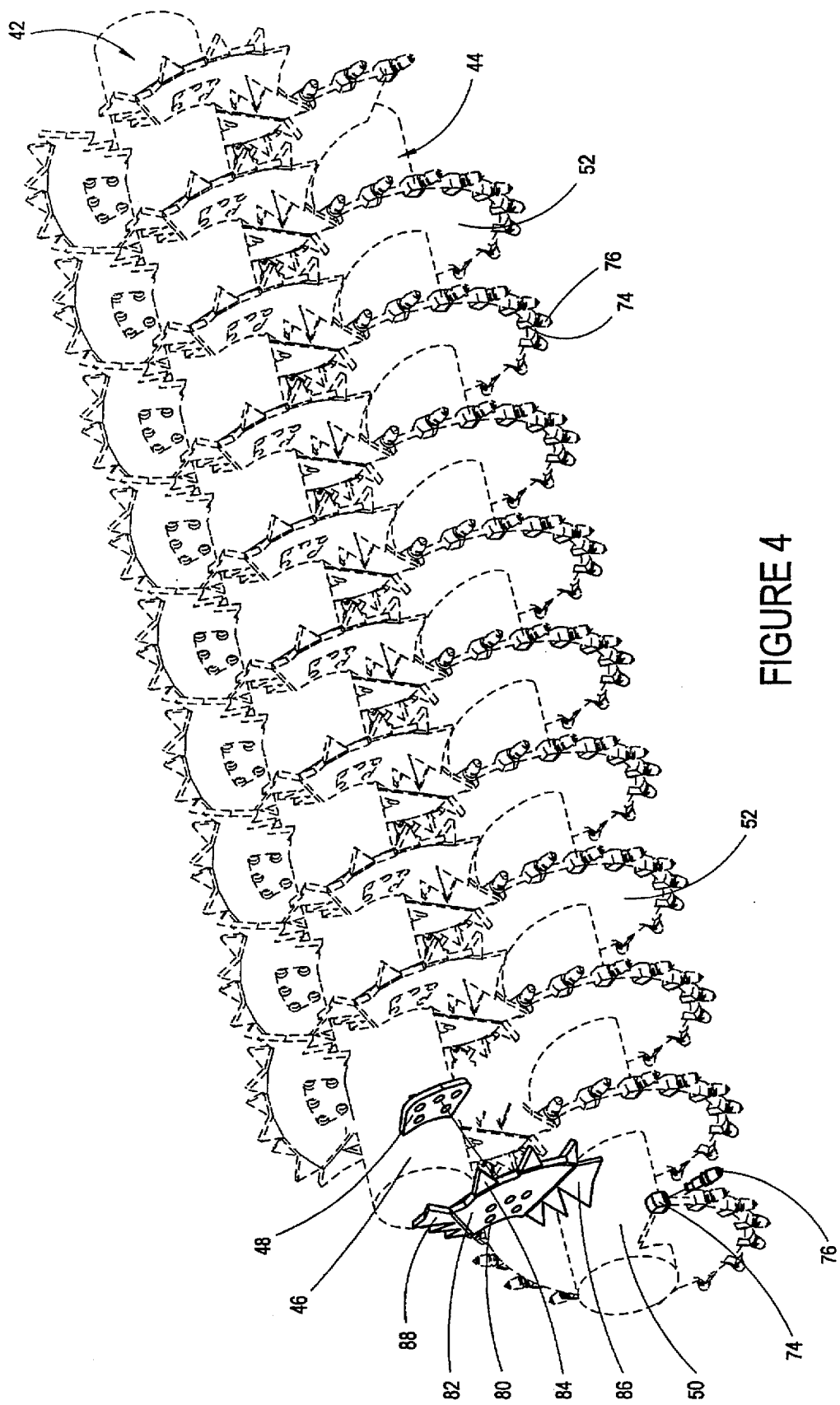
FIG. 4 is a perspective view showing the construction and relative positions of the upper and lower augers of the dual horizontal auger head assembly.

To break up hard soil, rock and the like, the lower auger flighting 52 carries a plurality of uniformly spaced apart sockets 74 (FIGS. 4 and 5) for receiving replaceable ground breaking bits 76, a preferred form of which are the round carbide tipped bits illustrated in the figures. That's our design for effective in the harshest conditions and are readily replaced to minimize servicing, down time and damage to the auger.

Figure 3:
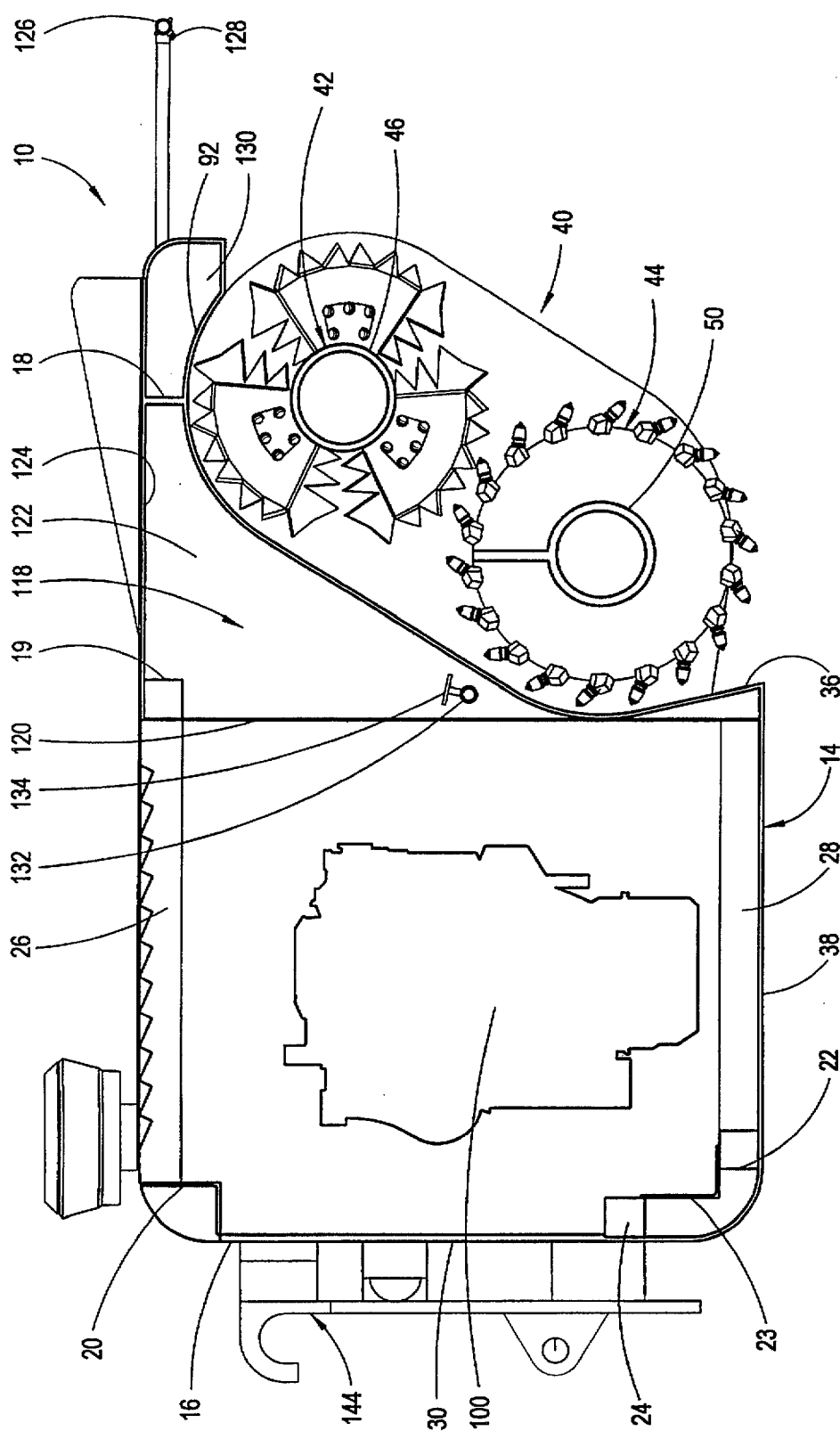
FIG. 3 is an enlarged side sectional view through the engine and dual auger assembly of the invention.
Figure 5:
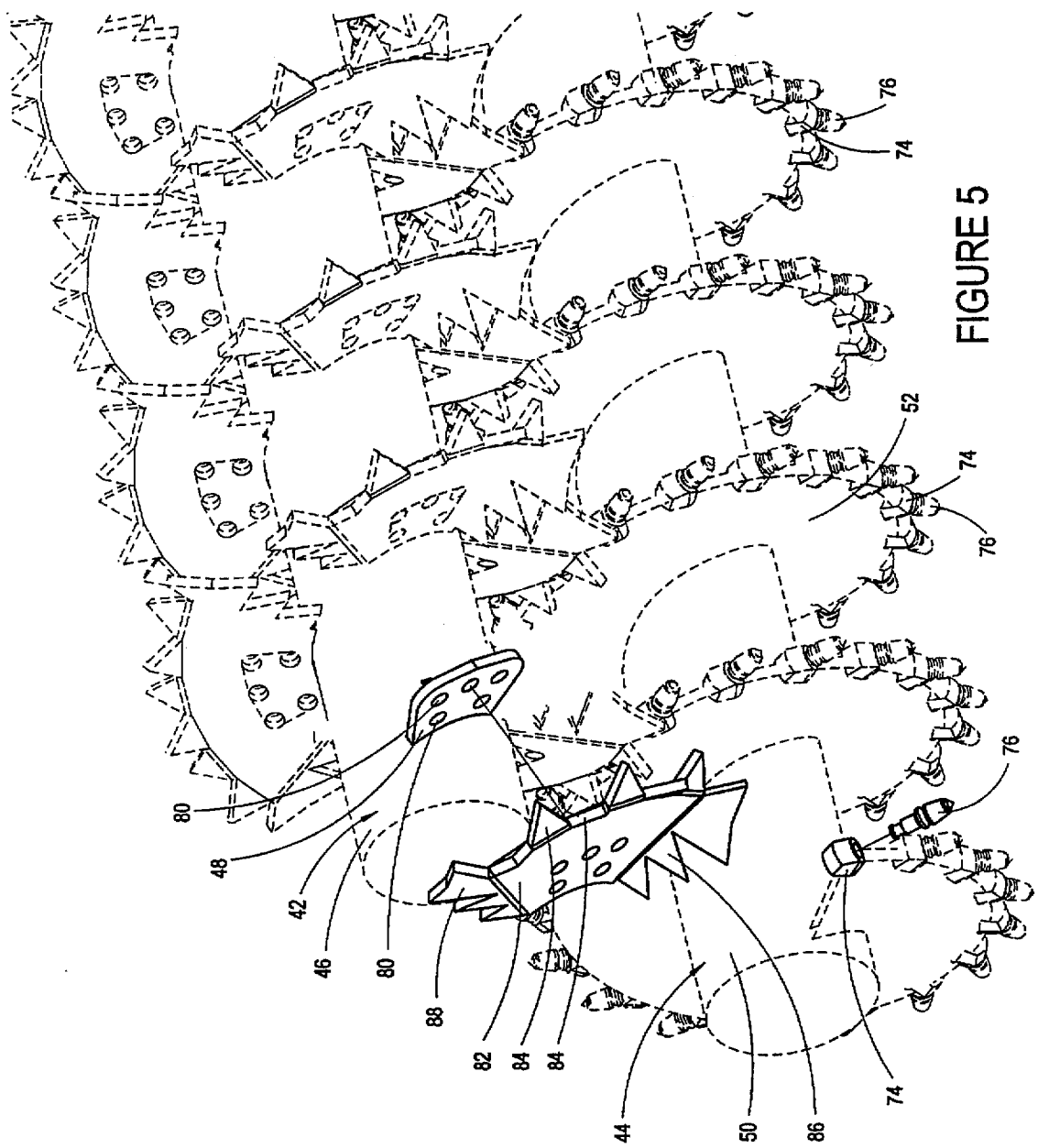
FIG. 5 is a further enlarged detailed perspective view of one end of the dual horizontal auger head assembly.

The preferred upper auger 42 illustrated in the figures has a plurality of paddles 48 arranged along the same one-half pitch as the lower auger flighting 52 in a balanced pattern with three paddles per flight, as seen in FIG. 3. Each paddle 48 has a series of bolt holes 80 for replaceable connection of a tooth module 82 onto the paddle 48. The outer edge 84 of each module 82 presents serrated teeth 84 alternately bent in opposite directions for thoroughly pulverizing and homogenizing soil encountered by the teeth in response to rotation of the upper auger 42. In FIG. 5, it can be seen that each module 82 furthermore has bent leading teeth 86 formed on the leading edge of the module and bent to the side in one direction and similar trailing teeth 88 on the trailing edge of the module and bent to the opposite side.

Referring to FIG. 3, an auger guard plate 36 serves multiple functions as the front wall of the housing 16 and bottom wall of the water tank as described herein below. Auger guard plate 36 is positioned rearwardly of and above the upper and lower augers 42 and 44 so that soil pulverized by the lower auger 44 is carried upwardly between the lower auger 44 and auger guard plate 36 for engagement by the upper auger 42. Likewise, the upper auger 42 carries soil upwardly and forwardly between the upper auger and curved top portion 92 of the auger guard plate 36 for thorough pulverizing and homogenizing of soil broken up by the lower auger before dispensing that soil outwardly from the front of the dual horizontal auger head assembly 40 for further pulverization until it transversely moved into the windrow at the free-end of the augers.

Soil pulverization by the dual horizontal auger head assembly 40 of the invention is facilitated by relatively high speed rotation of the augers by the upper and lower hydraulic motors 68 and 70. The augers are preferably rotated at between 150 and 180 rpm as opposed to the typical 60 to 80 rpm rotation of known single auger units. These are high horsepower, high torque, low speed motors designed to develop approximately 6,000 to 10,000 foot-pounds of torque each in a preferred embodiment. Each motor has a direct drive coupling to its respective auger shaft by a billeted spleen 94. Likewise in the preferred embodiment, each motor has a 3" solid shaft which fits into a housing end plate with a wiper seal bearing. An exterior housing cover plate is gasketed so as to be liquid tight. The hydraulic motors are designed to be continually flushed with hydraulic fluid for constant cooling when operating.

Figure 6:
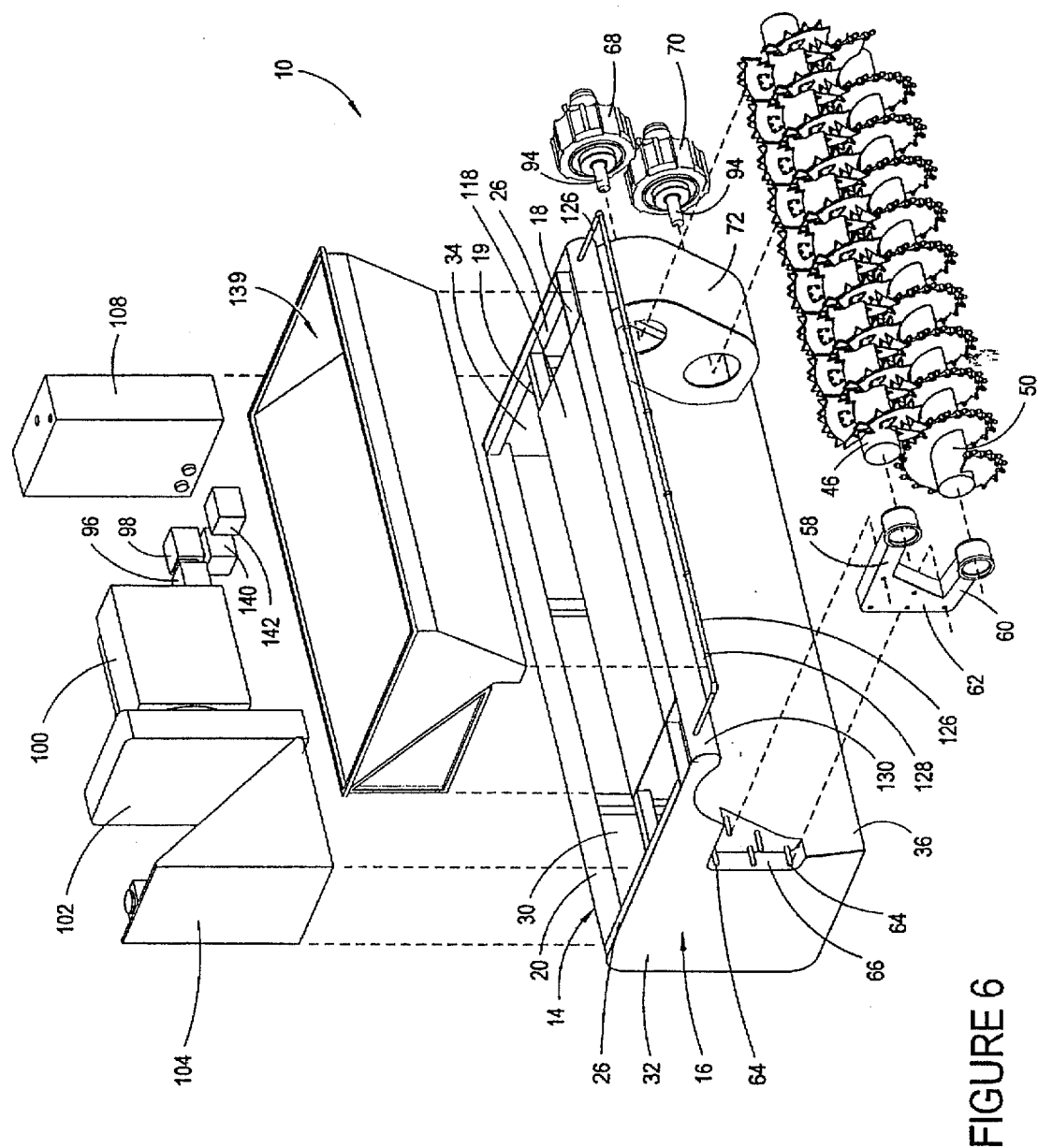
FIG. 6 is an exploded, partially diagrammatic, perspective view of the major components of the self-contained bioremediation unit of the invention.

In the preferred embodiment, upper and lower hydraulic motors 68 and 70 are driven by a pair of hydraulic pumps 96 and 98 which, in turn, are driven by diesel engine 100 illustrated diagrammatically in FIG. 6. Radiator 102 is interposed between diesel engine 100 and a generally triangular shaped diesel fuel tank 104 to afford sufficient flow of air through the housing top grading 106 to the radiator. By carrying its own engine, the bioremediation unit of the invention enables substantially the full power output of that engine to be directed to direct drive of the dual horizontal auger head assembly 40. Power is not shared with the drive wheels of the carrying vehicle nor is any drive connection required between the drive vehicle and bioremediation unit. A battery 142 is provided for starting the engine and as the electrical power source for lights and other electrical equipment so that the unit is fully self-contained.

Figure 7:
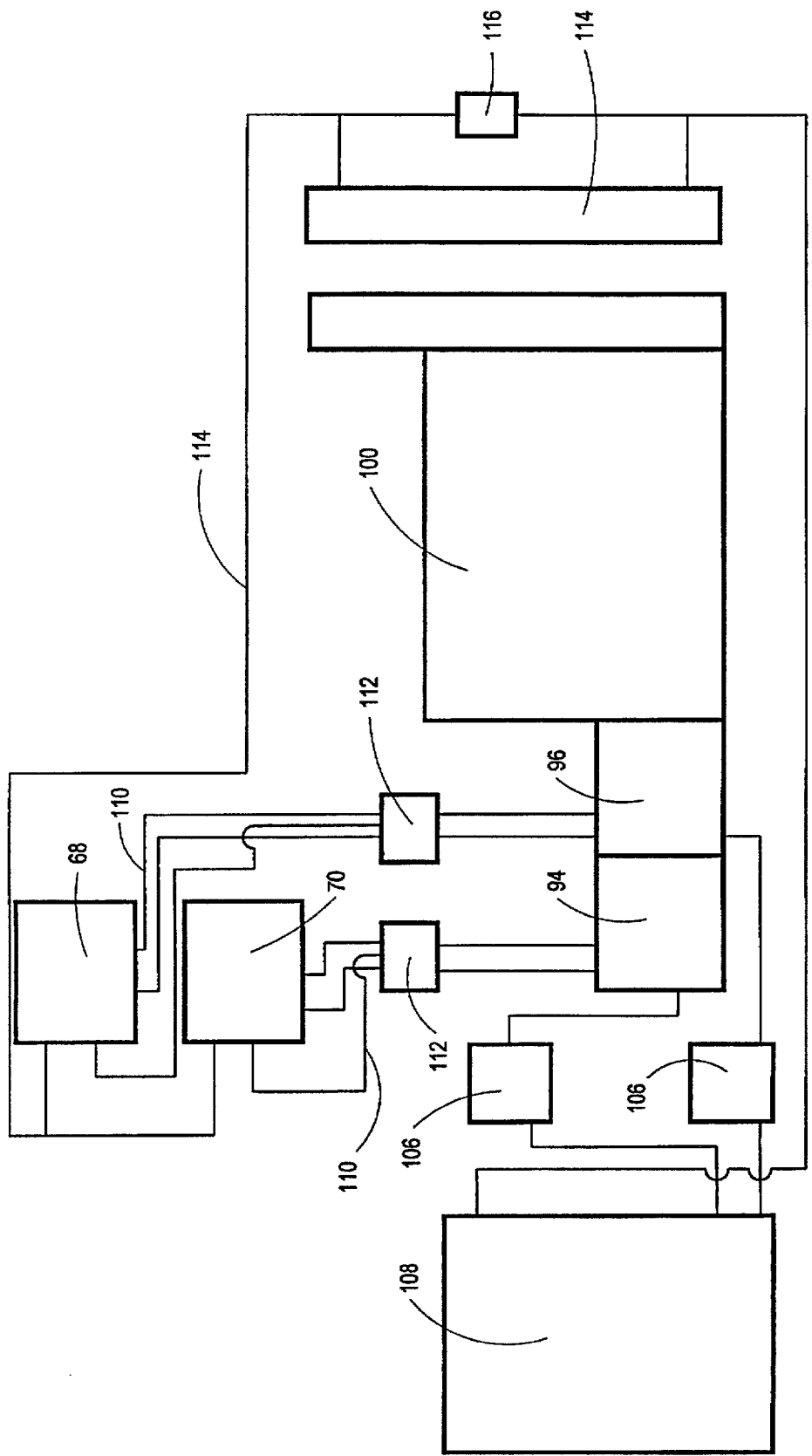
FIG. 7 is a hydraulic fluid circuit diagram for the self-contained bioremediation unit of the invention.

FIG. 7 illustrates a preferred hydraulic circuit diagram for the bioremediation unit and of the invention. Diesel engine 100 drives the pumps 96 and 98 which are connected by suction filters 106 to the hydraulic fluid reservoir 108. Hydraulic fluid from the pumps 96 and 98 is directed through short hoses 110 and loop flushing valves 112 to the upper and lower hydraulic motor 68 and 70. Hydraulic fluid is furthermore directed through low pressure hose 114 to the heat exchanger 114 and heat exchanger bypass check valve 116.

Bioremediation unit 10 likewise carries its own 200 gallon water tank 118 which is formed in the housing between the auger guard plate 36 and an upright front wall 120 of the engine compartment. Appropriate side walls 122 and a top wall 124 are welded to complete the water tank 118. Active ingredient is added to the water in tank 118 to effect the desired bioremediation of soil onto which the water and active ingredient are sprayed. The types and proportional amounts of active ingredient to add are known to those skilled in the bioremediation field and include bacteria, surfactants and nutrients, among others.

Water and active ingredient from tank 118 are directed by a suitable pump 140 (FIG. 6) to an elongated spray boom 126 stretched transversely across the unit forwardly of the dual horizontal auger head assembly 40. Spray boom 126 has a plurality of spray valves 128 positioned uniformly along the length of the boom for spraying water and active ingredient downwardly and rearwardly onto soil being pulverized by the rotating auger head assembly for thorough mixing of the water and active ingredient into the soil.

An air tank 130 is built into the housing above the dual auger head assembly 40, which tank is pressurized by a suitable compressor, not shown, driven from engine 100. Air tank 130 is connected by appropriate valving and tubing to an elongated air sparger tube 132 extended through a lower portion of water tank 118 for dispersing air into the water to keep the active ingredient bacteria alive as long as possible.

Figure 8:
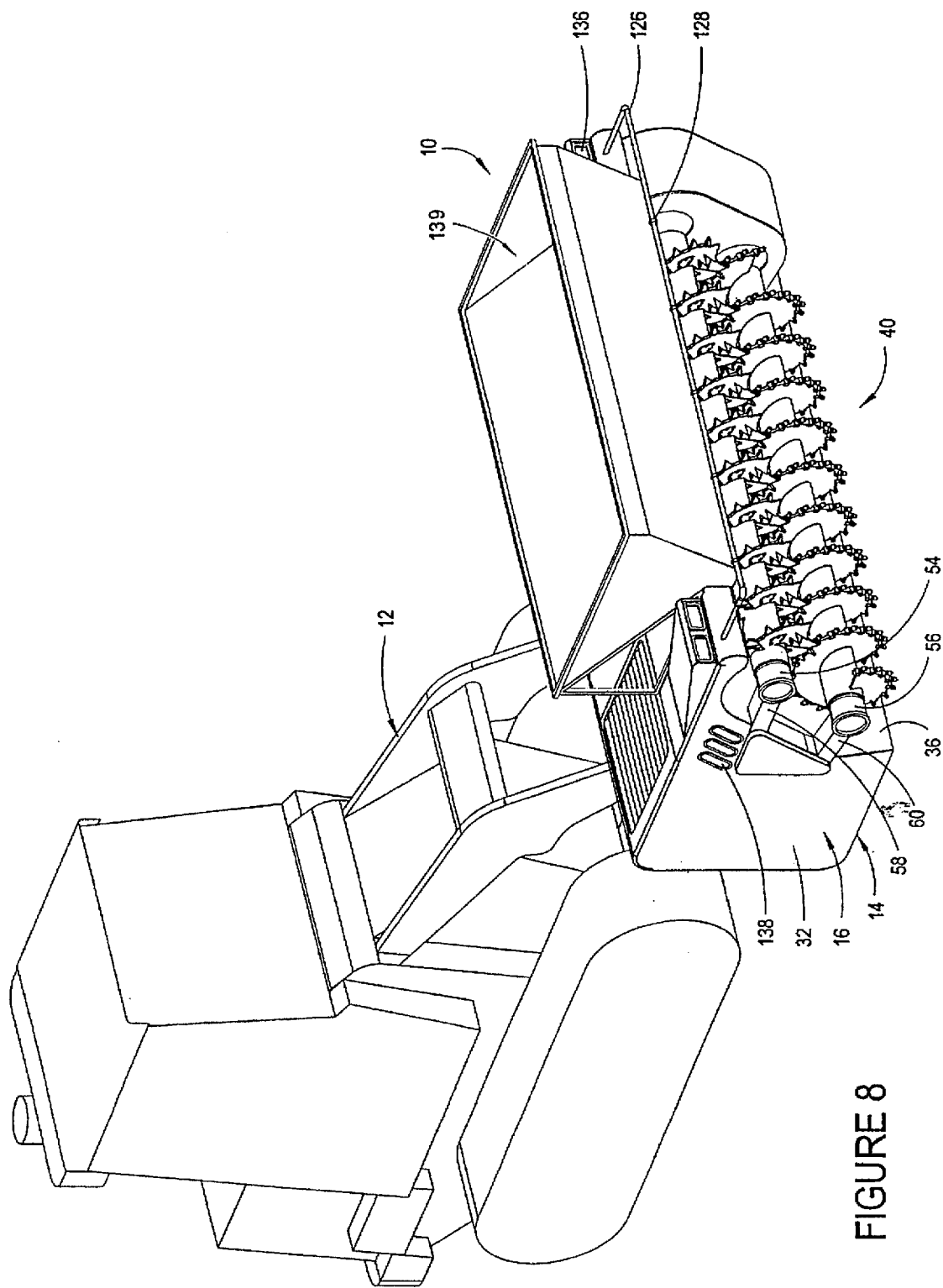
FIG. 8 is a perspecrtive view of the self-contained bioremediation unit of the invention with the fertilizer and material hopper mounted on the housing.

A hopper 139 is illustrated in FIGS. 6 and 8. Hopper 139 is carried on housing 16 and operates to dispense fertilizer or filler material onto the soil being broken up by the augers. Fertilizer may be added to balance the pH of the soil and to improve levels of sodium and nitrates so the active ingredient can work.

A pair of halogen headlight assemblies 136 are mounted on the front of the housing 116 at spaced apart locations for operation of the bioremediation unit 10 at night. Likewise, side warning lights 138 are provided on opposite sides of the housing 116 to warn of operation of the dual horizontal auger head assembly 40.

Transport of the bioremediation unit of the invention is easily accomplished by loading the unit sideways onto a low boy trailer or the like. With a front-to-back depth of seven feet or less and a transverse width of approximately twelve feet, the unit easily fits onto a trailer without causing the loaded trailer to exceed any highway size or weight limits. Accordingly, it can be transported to a spill site at any time of day or night.

Whereas the invention has been shown and described in connection with a preferred embodiment of the bioremediation unit 10, it is understood that many variations, modifications and additions may be made which are within the intended broad scope of the appended claims.

Thus the bioremediation unit 10 of the invention accomplishes at least all of the stated objects.

I claim:
1. A self-contained bioremediation unit adapted to be carried by a motorized vehicle, said unit comprising, a chassis means for detachably connecting said chassis to a motorized vehicle, a dual horizontal auger head assembly including,
 an upper auger,
 a lower auger,
 means for rotatably supporting said augers on said chassis with said upper auger positioned forwardly of said lower auger, an engine mounted on said chassis, a fuel tank mounted on said chassis and connected to said engine for supplying fuel thereto, at least one hydraulic pump mounted on said chassis and connected to and driven by said engine, upper and lower hydraulic motors mounted on said chassis and connected to said upper and lower augers respectively for rotating said augers, a hydraulic fluid reservoir mounted on said chassis and connected to said hydraulic pump and said hydraulic motors for flow of hydraulic fluid therebetween, a water tank mounted on said chassis, said water tank operative to contain water and an active ingredient for soil bioremediation, spray means mounted on said chassis and operative to spray water and said active ingredient onto soil traversed by said chassis, and a water pump means mounted on said chassis and connected to said water tank and spray means to pump water and said active ingredient from said water tank to and from said spray means, and an auger guard plate mounted on said chassis and positioned rearwardly of and above said upper and lower augers such that soil pulverized by said lower auger is carried upwardly between said lower auger and auger guard plate for engagement by said upper auger.

2. The self-contained bioremediation unit of claim 1 wherein said upper auger is positioned adjacent said lower auger for receiving and breaking up soil carried upwardly by said lower auger.

3. The self-contained bioremediation unit of claim 2 wherein said lower auger is equipped with a plurality of sockets for drive-in knock-out replacement of ground breaking bits and a plurality of ground breaking bits replaceably received in said sockets.

4. The self-contained bioremediation unit of claim 3 wherein said ground breaking bits are round carbide tipped bits.

5. The self-contained bioremediation unit of claim 3 wherein said upper auger comprises an upper auger shaft, a plurality of paddles mounted on said auger shaft and protruding radially therefrom, and a plurality of teeth replaceably connected to respective paddles for breaking down the particle size of soil engaged by said upper auger.

6. The self-contained bioremediation unit of claim 5 wherein said teeth of said upper auger are serrated teeth modules, each module replaceably connected to a respective paddle.

7. The self-contained bioremediation unit of claim 6 wherein each module includes an outer edge defining a plurality of serrated teeth alternately bent in opposite directions.

8. The self-contained bioremediation unit of claim 7 wherein each module further comprises a leading edge defining a plurality of leading teeth bent in one direction and a trailing edge defining a plurality of trailing teeth bent in an opposite direction.

9. The self-contained bioremediation unit of claim 2 wherein said dual auger head assembly is positioned forwardly of said engine.

10. The self-contained bioremediation unit of claim 1 wherein said spray means is positioned on said chassis for spraying water and bacteria at a position forwardly of said dual horizontal auger head assembly.

11. The self-contained bioremediation unit of claim 1 wherein said spray means is positioned on said chassis for spraying soil being pulverized by said dual horizontal auger head assembly.

12. The self-contained bioremediation unit of claim 1 wherein said chassis includes a housing sealed on the bottom and sides to substantially block fluid entry into said housing upon emergence of said bioremediation unit to a depth less than the height of said housing.

13. The self-contained bioremediation unit of claim 1 further comprising an air sparging means within said water tank and operative to discharge air into said water tank.

14. A self-contained bioremediation unit adapted to be carried by a motorized vehicle, said unit comprising, a chassis means for detachably connecting said chassis to a motorized vehicle, a dual horizontal auger head assembly including,
an upper auger,
a lower auger,
means for rotatably supporting said augers on said chassis with said upper auger positioned forwardly of said lower auger, an engine mounted on said chassis, a fuel tank mounted on said chassis and connected to said engine for supplying fuel thereto, a drive train mounted on said chassis and connected to and driven by said engine, and connected to and driving said augers, a water tank mounted on said chassis, said water tank operative to contain water and an active ingredient for soil bioremediation, spray means mounted on said chassis and operative to spray water and said active ingredient onto soil traversed by said chassis, and a water pump means mounted on said chassis and connected to said water tank and spray means to pump water and said active ingredient from said water tank to and from said spray means, and an auger guard plate mounted on said chassis and positioned rearwardly of and above said upper and lower augers such that soil pulverized by said lower auger is carried upwardly between said lower auger and auger guard plate for engagement by said upper auger.

* * * * *